United States Patent [19]

Harville

[11] 3,843,293

[45] Oct. 22, 1974

[54] MACHINE FOR MOLDING PLASTIC ARTICLE
[75] Inventor: Walter H. Harville, Finger, Tenn.
[73] Assignee: H & L Distributing Company, Finger, Tenn.
[22] Filed: July 27, 1972
[21] Appl. No.: 275,815

[52] U.S. Cl.......... 425/243, 425/245, 425/DIG. 110
[51] Int. Cl............................................. B29f 1/022
[58] Field of Search .......... 425/242, 243, 245, 251, 425/DIG. 110; 222/251

[56] References Cited
UNITED STATES PATENTS

| | | | |
|---|---|---|---|
| 2,377,946 | 6/1945 | Leary | 425/DIG. 110 |
| 3,016,574 | 1/1962 | Fischer et al. | 425/245 X |
| 3,068,518 | 12/1962 | Miller et al. | 425/243 X |
| 3,154,618 | 10/1964 | Baer et al. | 425/245 X |
| 3,436,446 | 4/1969 | Angell, Jr. | 425/242 X |
| 3,632,241 | 1/1972 | Vanderhagen et al. | 425/245 X |
| 3,776,989 | 12/1973 | Annis, Jr. et al. | 425/242 X |

Primary Examiner—Andrew R. Juhasz
Assistant Examiner—Robert J. Craig
Attorney, Agent, or Firm—John R. Walker, III

[57] ABSTRACT

A molding machine having a container for molten plastic, a mold for receiving and forming the molten plastic, and a valve for selectively allowing the molten plastic to pass from the container to the mold. Heat is maintained in the container for keeping the molten plastic molten. Compressed air is introduced to the container to force the molten plastic from the container, through the valve and into the mold.

14 Claims, 6 Drawing Figures

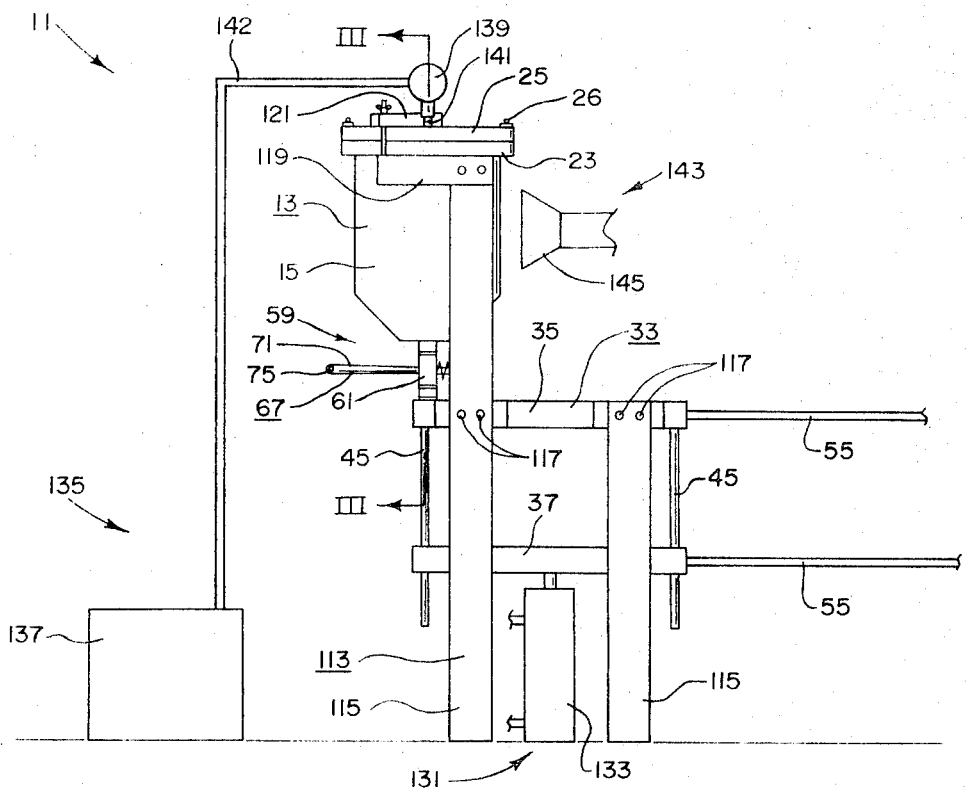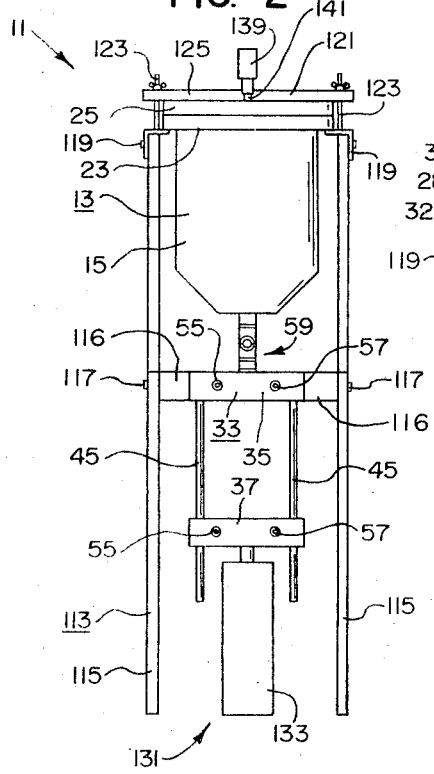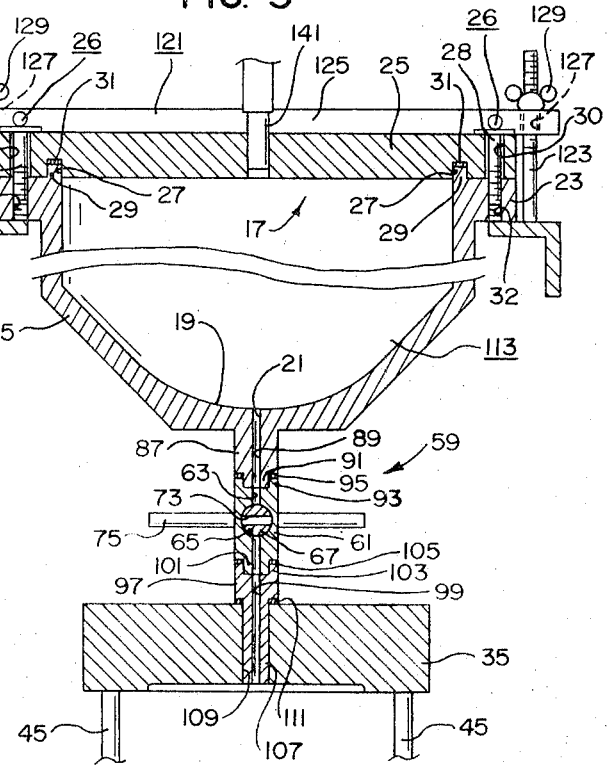

MACHINE FOR MOLDING PLASTIC ARTICLE

BACKGROUND OF THE INVENTION

1. Field of the Invention

This invention relates to machines for molding plastic articles.

2. Description of the Prior Art

A preliminary patentability search revealed the following U.S. Pats: Eichengrun No. 2,110,570; Bohannon No. 2,501,595; and Miller et al. No. 3,068,518. Eichengrun discloses a molding apparatus in which a plunger forces heated cellulose acetate material into a die. Bohannon discloses a pre-plasticizing unit for use with a plastic molding machine. Miller et al discloses an apparatus for molding hollow plastic products. None of the above references either discloses or suggests the present invention.

SUMMARY OF THE INVENTION

The present invention is directed towards overcoming the problems and disadvantages in previous machines for molding plastic articles. The concept of the present invention is to provide a molding machine that uses compressed air to force molten plastic into dies and that is of simple construction and is inexpensive to manufacture and operate.

The molding machine of the present invention includes a container for molten plastic, a mold for forming the molten plastic into the desired shape, and a valve positioned intermediate the container and the mold for selectively allowing the molten plastic to pass from the container to the mold. Heat is maintained in the container for keeping the molten plastic molten, and compressed air is introduced to the container to force the molten plastic from the container, through the valve and into the mold.

BRIEF DESCRIPTION OF THE DRAWINGS

FIG. 1 is a front elevational view of the molding machine of the present invention.

FIG. 2 is a right side view of the molding machine with some parts removed for clarity.

FIG. 3 is a sectional view taken as on the line III—III of FIG. 1 of a portion of the molding machine with some parts removed for clarity.

DESCRIPTION OF THE PREFERRED EMBODIMENT

Figure 4:
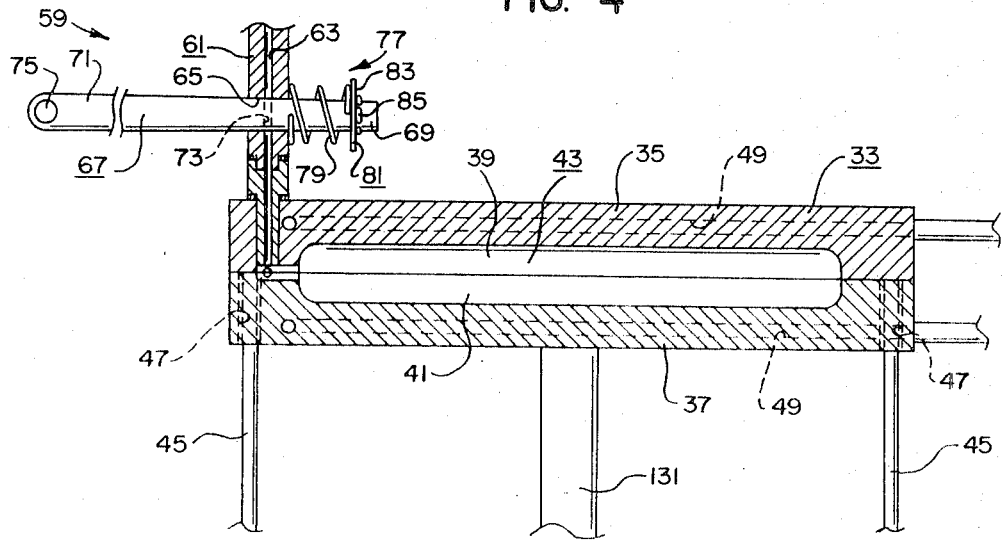
FIG. 4 is a sectional view of a portion of the molding machine showing the mold and the valve in detail, with some parts removed for clarity.
Figure 5:
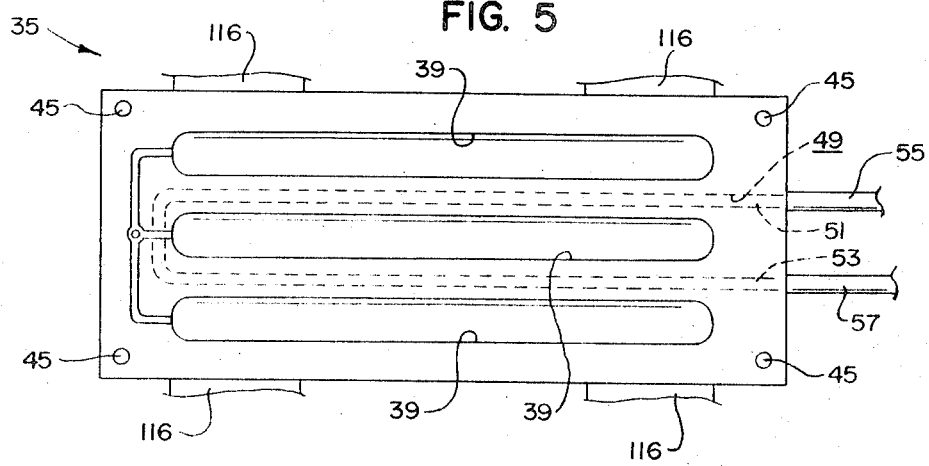
FIG. 5 is a bottom view of a first die of the mold.
Figure 6:
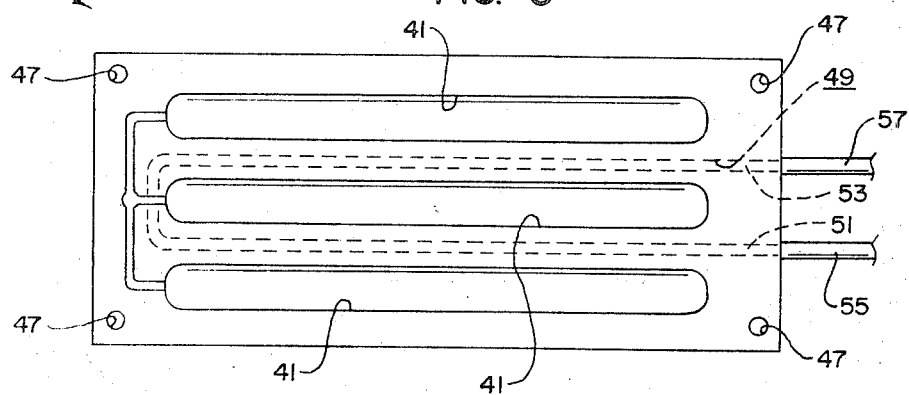
FIG. 6 is a top view of a second die of the mold.

The molding machine 11 has a container 13 for holding molten plastic. The container 13 is of preferably cylindrical construction and comprises a body 15 including an open top 17 and a substantially closed bottom 19. The bottom 19 has an exit opening 21 for allowing the molten plastic to pass from the container 13. A flange 25 extends around the open top 17 of the body 15. The container 13 also includes a lid 25 for substantially sealing the open top 17 of the body 15. A groove 27 is provided in the underneath surface of the lid 25 and coacts with a projection 29 on the open top 17 of the body 15. A rubber gasket 31 is positioned between the groove 27 and the projection 29 to provide a substantially airtight connection between the lid 25 and the body 15 of the container 13. A securing means 26 is provided for joining the body 15 and the lid 25 together. The securing means 26 preferably consist of screws 28 that fit through holes 30 in the lid 25 and screw into holes 32 in the flange 23 of the body 15.

The molding machine 11 has a mold 33 for receiving the molten plastic from the container 13 and for forming the molten plastic into the desired articles. The mold 33 includes a first die 35 and a second die 37. The second die 37 is movable from an open position away from the first die 35 as shown in FIGS. 1 and 2 to a closed position adjacent the first die 35 as shown in FIG. 4. The first die 35 includes at least one first cavity portion 39 and the second die 37 includes at least one second cavity portion 41. When the second die 37 is in the closed position, as shown in FIG. 4, the first cavity portion 39 and the second cavity portion 41 fit together to form at least one internal opening 43 which is in the shape of the article to be molded. Guides 45 are provided on the first die 35 and coact with holes 47 in the second die 37 to guide the second die 37 from the open position to the closed position. Cooling channels 49 are provided in the first and second dies 35, 37 to allow a coolant such as water to circulate therethrough to cool and harden the molten plastic. Although only one complete cooling channel 49 has been shown in the drawings, any number of cooling channels 49 could be incorporated in the first and second dies 35, 37 depending on their size. It should be noted that a complete cooling channel 49 consists of an inlet portion 51 and an outlet portion 53. A pump (not shown) forces the liquid from a tank or the like (not shown) to the inlet portions 51 of the cooling channels 49 through inlet hose 55. The liquid then passes through the cooling channel 49, out the outlet portions 53, through outlet hose 57 and into a tank or the like (not shown).

A valve 59 is provided intermediate the container 13 and the mold 33 for selectively allowing the molten plastic to be introduced to the mold 33 from the container 13. The valve 59 includes a conduit 61 extending between the container 13 and the mold 33. The conduit 61 has a hole 63 for guiding the molten plastic from the container 13 to the mold 33. A tapered transverse bore 65 is included in the conduit 61. The valve 59 includes a tapered shaft 67 passing through the bore 65 in the conduit 61. The tapered shaft 67 includes a first end 69 and a second end 71. A transverse bore 73 is provided in the first end 69 of the shaft 67. A handle 75 is provided on the second end 71 of the shaft 67 for aligning and disaligning the transverse bore 73 with the hole 63 in the conduit 61 thereby allowing the molten plastic to be selectively introduced to the mold 33 from the container 13. The valve 59 also includes a spring means 77 mounted on the first end 69 of the shaft 67 for forcing the tapered shaft 67 against the tapered bore 65 in the conduit 61 to provide a substantially leak-free joining thereof. The spring means 77 includes a spring 79, and a securing means 81 securing the spring to the shaft 67. The securing means 81 can be of any typical construction known to those skilled in the art. For example, a plate 83 can force the spring 79 between itself and the conduit 61 and a cotter pin 85 passing through the shaft 67 adjacent the plate 83 on the side opposite the spring 79 and the conduit 61 can prevent the plate 83 from being pushed off the shaft 67 by the spring 79.

The substantially closed bottom 19 of the container 13 is provided with a projection 87 for connection to the valve 59. The projection 87 is provided with a hole 89 which corresponds to the hole 63 in the conduit 61 and leads from the exit opening 21 in the bottom 19 of the container 13. The projection 87 includes a reduced male portion 91 which fits into a reduced female portion 93 in the conduit 61. A first O-ring 95 fits between the projection 87 and the conduit 61 to provide a substantially leak-free joining thereof. A connection 97 connects the valve 59 to the first die 35. The connection 97 has a hole 99 which corresponds to the hole 63 in the conduit 51. The conduit 61 has a reduced male portion 101 which fits into a reduced female portion 103 of the connection 97. A second O-ring 105 fits between the conduit 61 and the connection 97 to provide a substantially leak-free joining thereof. The connection 97 has a reduced male portion 107 which fits into a hole 109 in the first die 35. A third O-ring 111 fits between the connection 97 and the first die 35 to provide a substantially leak-free joining thereof.

The molding machine 11 includes a frame 113 for securing the container 13 and the first die 35 of the mold 33 in a fixed relationship with each other. The frame 113 has leg portions 115 that are attached to the first die 35 through members 116 by means such as screws 117. The frame 113 includes a supporting structure 119 supports the container 13. The supporting structure 119 is attached to two of the leg portions 115 and coacts with the flange 23 to support the container 13. A clamp means 121 forces the flange 23 and the lid 25 of the container 13 against the supporting structure 119. The clamp means 121 comprises two screw members 123 attached to the suppporting structure 119, a bar 125 passing over the lid 25 of the container 13 and having holes 127 on each end thereof for allowing the screw members 123 to pass through, and wingnuts 129 for tightening the bar 125 against the lid 25 of the container 15.

The molding machine 11 includes means 131 for moving the second die 37 from the open position to the closed position. The means 131 preferably comprises an air-activated cylinder 133 of typical construction well known to those skilled in the art.

The molding machine 11 includes means 135 for providing compressed air to the container 13. The means 135 preferably comprises an air compressor 137 and an air regulator 139 positioned intermediate the air compressor 137 and the container 13. The lid 25 of the container 13 has an attachment 141 for connection to the air regulator 139 to allow compressed air to flow from the air compressor 137 through a hose 142 into the air regulator 139 and into the container 13. The air regulator 139 activates the air compressor 137 when the air pressure inside the container 13 is below a set amount.

The molding machine 11 includes means 143 for maintaining heat in the container 13. Means 143 may comprise heat lamps 145 as shown in the drawings or any other means known to those skilled in the art, such as electrical resistance coils or the like.

In normal operation the sequence of steps in molding the plastic articles begin with molten plastic being placed in the container 13 through the open top 17. The heat lamps 145 are activated to maintain heat in the container 13 and, thus, keep the molten plastic molten. The container 13 is then closed by placing the lid 25 onto the open top 17 and is then sealed by tightening the securing means 26. Air from the air compressor 137 is then forced into the container 13 through the attachment 141. Next, the first die 35 is moved to the closed position by the air-activated cylinder 133. The valve 59 is then opened, allowing the compressed air to force the molten plastic from the container 13, through the valve 59, and into the mold 33. The molten plastic in the mold 33 is then hardened, preferably by coolant being forced through the cooling channels 49. Next, the first die 35 is moved to the open position by the air-activated cylinder 133. The molding operation is now complete and the plastic articles are ready to be removed from the mold 33.

Although the invention has been described and illustrated with respect to a preferred embodiment thereof, it is not to be so limited since changes and modifications may be made therein which are within the full intended scope of the invention.

I claim:

1. Apparatus for molding plastic articles from molten plastic, said apparatus comprising:

container means for the molten plastic;

mold means for forming the plastic articles, said mold means being located below said container means, said mold means including a first die and a second die, said second die being relatively moveable from an open position away from said first die to a closed position adjacent said first die;

means for moving said second die from the open to the closed position;

valve means for selectively allowing the molten plastic to be introduced to said mold means from said container means, said valve means being positioned intermediate said container means and said mold means;

means for providing compressed air directly communicated with the interior of said container means for forcing the molten plastic from said container means into said mold means; and means for maintaining heat in said container means for keeping the molten plastic molten.

2. The apparatus of claim 1 in which said container means comprises:

body means including an open top and a substantially closed bottom having an exit opening for the molten plastic;

lid means for substantially sealing said open top of said body means, said lid means including an attachment means for attachment to said means for providing compressed air; and securing means for securing said lid means to said body means.

3. The apparatus of claim 2 in which said apparatus includes a frame means for securing said container means and said first die of said mold means in a fixed relationship with each other, in which said body means includes a flange portion around said open top, and in which said apparatus includes a clamp means for clamping said flange portion against said frame means.

4. The apparatus of claim 1 in which said first die includes at least one first cavity portion, and in which said second die includes at least one second cavity portion; said first and second cavity portions defining at least one internal opening for receiving the molten plastic when said second die is in the closed position adjacent said first die.

5. The apparatus of claim 1 in which said first and second dies include cooling channels for allowing a liquid to circulate therethrough and thereby cool and harden the molten plastic.

6. The apparatus of claim 1 in which said means for moving said second die from the open to the closed position comprises an air-activated cylinder.

7. Apparatus for molding plastic articles from molten plastic, said apparatus comprising:

container means for the molten plastic;

mold means for forming the plastic articles, said mold means including a first die and a second die, said second die being relatively movable from an open position away from said first die to a closed position adjacent said first die;

means for moving said second die from the open to the closed position;

valve means for selectively allowing the molten plastic to be introduced to said mold means from said container means, said valve means being positioned intermediate said container means and said mold means, said valve means including a conduit extending between said container means and said mold means for guiding the molten plastic from said container means to said mold means, said conduit having a tapered transverse bore therethrough, said valve means including a tapered shaft passing through said bore in said conduit, said shaft having a first end and a second end, said first end having a transverse bore therethrough, said second end having a handle for rotating said shaft in said transverse bore of said conduit for aligning and disaligning said transverse bore of said shaft with said conduit thereby allowing the molten plastic to be introduced to said mold means from said container means, and said valve means including spring means mounted on said first end of said shaft adjacent said conduit for forcing said tapered shaft against said tapered bore of said conduit to provide a substantially leak-free joining thereof;

means for providing compressed air directly communicated with the interior of said container means for forcing the molten plastic from said container means into said mold means; and means for maintaining heat in said container means for keeping the molten plastic molten.

8. The apparatus of claim 1 in which said means for providing compressed air to said container means comprises an air compressor and an air regulator mounted intermediate said container means and said air compressor; said air regulator activating said air compressor when the air pressure inside said container means is below a set amount.

9. The apparatus of claim 1 in which said means for maintaining heat in said container means comprises heat lamps adjacent said container.

10. Apparatus for molding plastic articles from molten plastic, said apparatus comprising:

container means for the molten plastic including a body means having an open top and a substantially closed bottom having an exit opening for the molten plastic, lid means for substantially sealing said open top of said body means, and securing means for securing said lid means to said body means;

mold means for forming the plastic articles, said mold means including a first die having at least one first cavity portion and a second die having at least one second cavity portion, said second die being movable from an open position away from said first die to a closed position adjacent said first die, said first and second cavity portions defining at least one internal opening for receiving the molten plastic when said second die is in the closed position, said first and second dies including cooling channels for allowing a liquid to circulate therethrough and thereby cool and harden the molten plastic;

means for moving said second die from the open position to the closed position;

valve means intermediate said container means and said mold means for selectively allowing the molten plastic to be introduced to said mold means from said container means, said valve means including a conduit for guiding the molten plastic from said container means to said mold means and having a tapered bore therethrough, a tapered shaft passing through said bore in said conduit and having a transverse bore through one end thereof adjacent said conduit, and spring means mounted on said shaft adjacent said conduit for forcing said tapered shaft against said tapered bore of said conduit to provide a substantially leak-free joining thereof, said shaft being rotatable in said bore of said conduit for aligning and disaligning said bore in said shaft with said conduit thereby allowing the molten plastic to pass through said valve means;

frame means for securing said container means and said first die of said mold means in a fixed relationship with each other;

means for providing compressed air to said container means for forcing the molten plastic through said exit opening in said container means, past said valve means and into said mold means; and means for maintaining heat in said container means for keeping the molten plastic molten.

11. The apparatus of claim 10 in which said means for moving said second die from the open position to the closed position comprises an air-activated cylinder.

12. The apparatus of claim 10 in which said means for providing compressed air to said container means comprises an air compressor and an air regulator mounted intermediate said lid means of said container means and said air compressor; said air regulator activating said air compressor when the air pressure inside container means is below a set amount.

13. The apparatus of claim 10 in which means for maintaining heat in said container means comprises heat lamps adjacent said container means.

14. Apparatus for molding plastic articles from molten plastic, said apparatus comprising:

container means for the molten plastic;

mold means for forming the plastic articles, said mold means being located below said container means said mold means including a first die and a second die, said second die being relatively movable from an open position away from said first die to a closed position adajcent said first die;

means for moving said second die from the open to the closed position;

valve means intermediate said container means and said mold means for selectively allowing the molten plastic to be introduced to said mold means from said container means, said valve means including a conduit for guiding the molten plastic from said container means to said mold means, said conduit having a transverse bore therethrough, and including a shaft for passing through said bore in said conduit, said shaft having a transverse bore therethrough, said shaft being rotatable in said bore of said conduit for aligning and disaligning said bore in said shaft with said conduit thereby selectively allowing the molten plastic to pass through said valve means;

means for providing compressed air directly communicated with the interior of said container means for forcing the molten plastic from said container means into said mold means; and means for maintaining heat in said container means for keeping the molten plastic molten.

* * * * *